C. ELLIS.
REMOVING CATALYZER FROM OIL.
APPLICATION FILED DEC 30, 1915.
1,390,688. Patented Sept. 13, 1921.
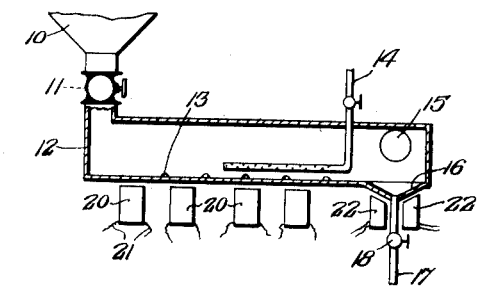
Fig. 1.
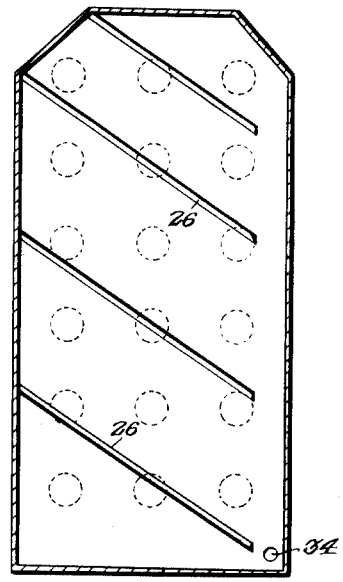
Fig. 3.
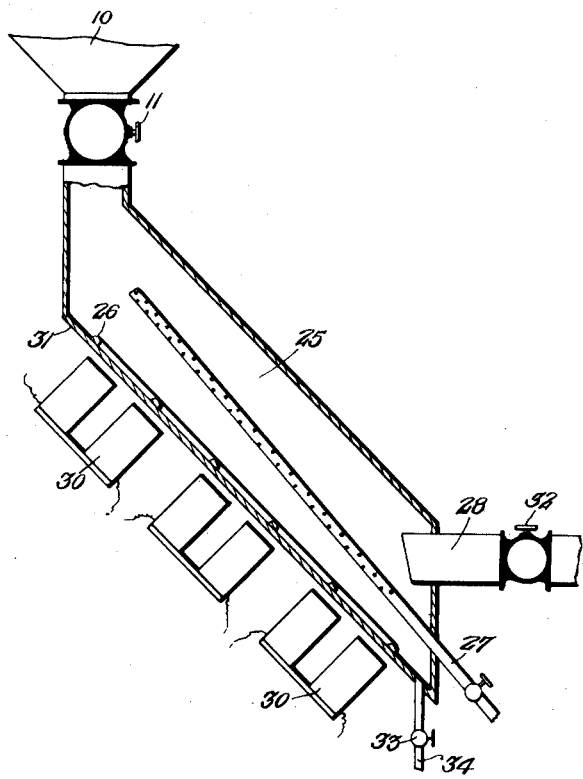
Fig. 2.
Fig. 4.
Inventor
Carleton Ellis,
By A. B. Foster.
Attorney

UNITED STATES PATENT OFFICE.

CARLETON ELLIS, OF MONTCLAIR, NEW JERSEY.

REMOVING CATALYZER FROM OIL.

1,390,688.  Specification of Letters Patent.  Patented Sept. 13, 1921.

Application filed December 30, 1915. Serial No. 69,389.

*To all whom it may concern:*

Be it known that I, CARLETON ELLIS, a citizen of the United States, and a resident of Montclair, in the county of Essex and State of New Jersey, have invented certain new and useful Improvements in Removing Catalyzer from Oil, of which the following is a specification.

This invention relates to a method of removing catalytic material from fatty oils and the like in catalytic operations such as in the hydrogenation process of saturating unsaturated organic material with hydrogen or hydrogen-containing gases.

My invention relates primarily to the magnetic separation of catalytic material which is capable of being attracted by an electromagnet or permanent magnet or other body capable of exerting magnetic force and relates in particular to the removal of finely divided nickel or magnetizable nickel oxid from fatty oils by means of a suitable magnet. Finely-divided nickel material prepared by decomposition of organic nickel salts such as nickel formate, acetate and other salts of the higher fatty acids is very finely-divided and is partly at least in a colloidal form. This nickel material is somewhat difficult to filter. It is however, readily attracted to the magnet (or in other words it is magnetic) and by exerting a magnetic influence on a body of oil containing this material the latter is drawn to the poles of the magnet in a large measure and thereupon may be removed from the oily material. Nickel obtained from nickel carbonyl, also nickel obtained by dry reduction with hydrogen is attracted in a similar manner. Nickel supported on carriers also may oftentimes be satisfactorily removed by such magnetic force.

The magnetic zone of influence may be exerted over and through a large body of oil containing suspended catalyzer as by placing magnetizable sections around or in any suitable part of a receptacle employed for the hydrogenating operation. Or the oil and suspended catalyzer may be allowed to flow along a plate under which electromagnets are placed, causing the suspended catalyzer to collect in spongy masses around the magnetic poles and allowing the oil to pass off in a state of substantial clarity. An aluminum plate slightly inclined and with or without riffles for collecting the catalyzer may be employed for this purpose. If the plate is sharply inclined and a strong magnetic force is used, the catalyzer collects within the magnetic zone at the surface of the aluminum plate forming sharply defined masses around each pole. After the oil has been passed through the magnetic zone the electric current is shut off, and with the cessation of magnetic action the catalytic material slides down the plate and is collected in a suitable receptacle and returned to the hydrogenation tank for further use.

The oil from the magnetic separator oftentimes contains traces of nickel material which may be removed by filtering as by means of a filter press. In the preferred form of my invention using finely-divided nickel without a carrier, the filter cloths or filter screens of Monel metal or other material may be first coated with a thin layer of fine fullers' earth, clay or infusorial earth and the like. This may be painted with a brush on the filter cloths in the case of an open filter and when using a filter press the cloths may be coated by suspending a small amount of the earth in some oil and pumping the mixture through the press until the portions have been satisfactorily sealed with such suspended material and are fitted to retain the deposit of finely-divided nickel. By proceeding in this manner it is possible to first magnetically remove the bulk of the nickel and especially that portion which would materially clog the filter press and leave only an insignificant amount to be removed by the latter. This procedure makes it possible to collect the catalyzer without any undue exposure to air and without that handling arising from frequent removal of catalyzer from the filter press which is oftentimes objectionable and detrimental to the activity of the catalyst. From time to time but at relatively considerable intervals the filter press is opened to remove such aggregations of the residual nickel material as may have collected and this may be returned to the hydrogenation apparatus if desired. The filter press may be kept at a relatively high temperature and the oil may be kept saturated with hydrogen at the temperature used, as the removal of the bulk of the nickel by magnetic withdrawal permits higher temperatures to be used in filtration and also to maintain reducing conditions during such step.

In the chamber in which the nickel is removed by magnetic action an atmosphere of hydrogen gas may be maintained and the temperature may be held at 170–270° C. if desired or at a point where nickel soaps which tend to form at a lower temperature and in the absence of hydrogen are prevented from forming and the nickel is maintained substantially out of solution so that a highly nickel-free oil or fat is derived. This high temperature and reducing condition is difficult to maintain in an ordinary filter press even though Monel metal filter cloths or similar filtering screens are employed.

Without restricting myself to the employment of particular apparatus, I will state that apparatus such as is shown in the annexed drawing, may be used in carrying out the process. In said drawing, Figure 1 represents the lower end of a hydrogenation receptacle or a tank into which the oil from the hydrogenation tank flows. Fig. 2 shows a vertical section of a similar combination, the separation chamber being in this instance more sharply inclined. Fig. 3 shows a plate which may form the bottom of the elongated receptacle shown in Fig. 2. Fig. 4 represents a vertical section of a modified form of apparatus in which the magnets may be immersed in the oil under treatment.

Referring more particularly to Fig. 1, 10 represents the conical bottom of a hydrogenation tank or receptacle or a receptacle into which the mixture of hydrogenated oil and catalyzer flows from the hydrogenation receptacle. The oil withdrawn from this receptacle through valve 11 flows through an elongated receptacle 12, which may be slightly inclined as shown in this figure. In the bottom of this receptacle are placed a number of riffles 13, which may extend diagonally of the length of the tank. 14 represents a pipe through which hydrogen may be introduced into the oil in said receptacle. The oil may find exit through the pipe 15, located at the lower end of the receptacle 12, but preferably a considerable distance above the bottom of the receptacle. Immediately below the pipe 15 and running transversely of the receptacle 12 is a hopper-shaped depression 16, connected with an outlet pipe 17 having a valve 18. Arranged below the bottom of the tank 12 are a number of magnets 20, here shown as being electro-magnets provided with connecting wires 21 for connecting to a suitable source of electricity. At 22 are also shown other electro-magnets located below the depression 16 in the bottom of the tank. The magnets may be in actual contact with the bottom of tank 12, which tank, for example, may be made of aluminum, if desired.

In Fig. 2 is shown a modified form of construction in which the tank 25 is more sharply inclined. As shown in Figs. 2 and 3, this tank may have a number of diagonally extending riffles 26 on the bottom thereof for directing material toward the right hand side (in Fig. 3). Hydrogen may be introduced to this receptacle through valved pipe 27, which is perforated, as shown. 28 represents the oil outflow pipe, which may deal to a filter press. Magnets 30, preferably arranged in pairs, are located below the bottom 31 of the tank, which may be made of aluminum. The oil may be allowed to flow through the tank 25 and out through pipe 28 until a considerable volume of nickel has accumulated on the bottom 31, whereupon the valve 11 may be closed, the valve 32 closed, and the magnets deënergized, after which the valve 33 will be opened and the mixture of oil and catalyst may flow out through pipe 34.

In the device shown in Fig. 4, the oil may flow into the receptacle 40, through pipe 41, and may leave through pipe 42. Located in the bottom of this receptacle area number of magnets, the magnet 43 being illustrated as a soft iron core, which may be energized by bringing a permanent magnet or electro-magnet 44 against the lower end thereof. This magnet can be deenergized by removing the magnet 44. At 45 is shown a soft iron plate having an extension 46 passing through the bottom of tank 40 and a suitable helix 47 surrounds the stem 46. On passing an electric current through this helix, the plate 45 becomes magnetized. When a sufficient amount of nickel sludge has accumulated in the lower part of tank 40, the flow to this pipe 41 may be discontinued and the valve in outlet pipe 48 may be opened to remove this nickel sludge.

What I claim is:—

1. A process of separating magnetizable finely divided magnetic catalyzer from hydrogenated oil which comprises passing the oil while in the form of a flowing current, past a stationary magnet, located in proximity to said current, while said oil contains free hydrogen, and thereafter filtering said oil while containing free hydrogen, and while at a temperature above atmospheric.

2. The process of removing catalyzer comprising material of a nickel nature from oil after the hardening operation has been sufficiently completed which comprises exposing a thin stream of the oil while carrying uncombined hydrogen in solution therein, and entrained catalyzer to magnetic action exerted from beneath said stream to withdraw from the oil substantially the major portion of the catalytic material.

3. The process of removing catalytic material of a magnetizable nature from oil after a catalytic hardening operation has been sufficiently completed which comprises allowing the oil containing dissolved hydrogen and suspended catalyzer to flow down an inclined plane past a magnetic zone to withdraw from the oil substantially the major portion of the catalytic material.

CARLETON ELLIS.